R. VOSE.

Car Spring.

No. 57,600.

Patented Aug. 28, 1866.

Witnesses:

Inventor:

Richard Vose
Per his atty.

UNITED STATES PATENT OFFICE

RICHARD VOSE, OF NEW YORK, N. Y.

IMPROVED INDIA-RUBBER CAR-SPRING.

Specification forming part of Letters Patent No. 57,600, dated August 28, 1866.

*To all whom it may concern:*

Be it known that I, RICHARD VOSE, of the city, county, and State of New York, have invented a new and useful Improvement in the Manufacture of India-Rubber Springs for Railroad-Cars and other Purposes; and I do hereby declare that the following is a full, clear, and exact description thereof, reference being had to the accompanying drawings, forming a part of this specification, and in which—

Figure 3:
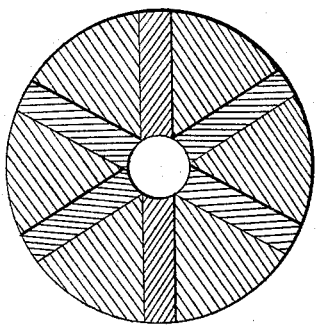
Figure 6:
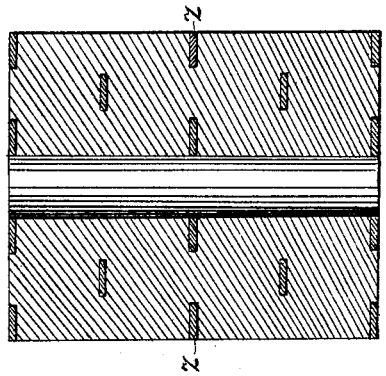
Figure 2:
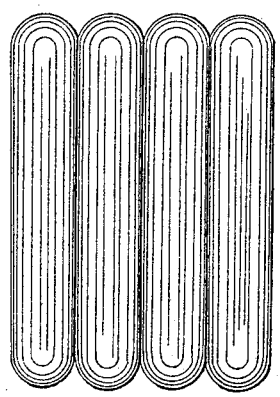
Figure 4:
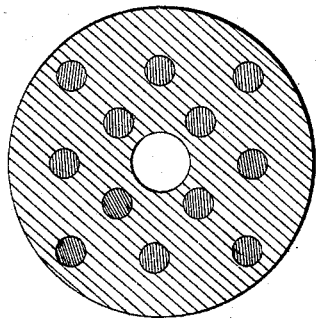
Figure 1:
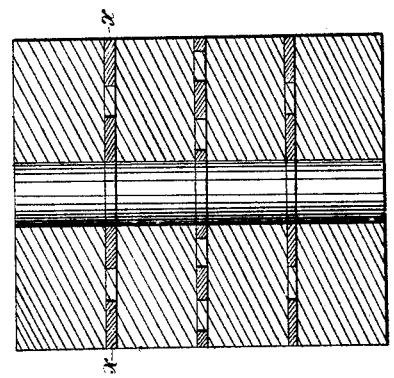
Figure 5:
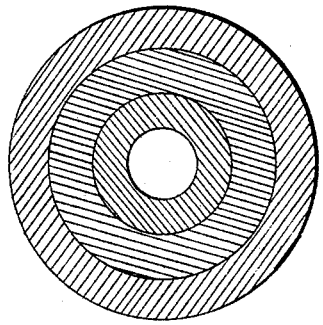

Figure 1 is a central vertical section through one form of my improved spring having perforated fibrous disks interleaved between rubber sections; Fig. 2, a transverse section through the line $x\ x$, Fig. 1; Fig. 3, an elevation of the spring shown in Fig. 1 under pressure; Fig. 4, a central section of another form of my springs; Fig. 5, a transverse section in line $z\ z$ of Fig. 4; Fig. 6, a transverse section of a spring having radiating controlling-strips combined therewith.

Similar letters indicate like parts in all of the figures.

The nature of my invention consists in the intimate combination of transverse strips or layers of felt cloth or other non-metallic or comparatively non-elastic material with india-rubber in the composition and manufacture of springs for railway-cars and other vehicles, whereby the expansion of the rubber is controlled and its play confined to certain desired points.

This combination of the rubber with other material to control its expansion is best effected by cementing the two together while the rubber-gum is in a crude or unvulcanized condition, and then fixing and intimately combining them into a solid mass by vulcanizing the rubber in contact with the associated material; but I contemplate also other forms of cementing vulcanized rubber and strips of fibrous material in any permanent manner. I contemplate thus combining alternate disks or layers of rubber and wood, felt, wool, or any other non-metallic substance, not confining myself to any form of either rubber or of the associated material.

I prefer felt, or an equivalent slightly-elastic fibrous material, in combination with the rubber, in manufacturing my improved springs, as the spring then possesses throughout a freedom of movement and action not attained where an entirely non-elastic substance, such as wood, is employed.

The springs may be best made by taking disks of india-rubber in a crude state and interposing between them thin sheets or disks of felt, which, by preference, I perforate with a number of apertures, as seen in Fig. 2. These disks of thick rubber and comparatively thin felt are made to adhere together by the use of any convenient cementing gum or liquid—such as a solution of rubber in benzine—in any number required to form a spring of the proper length or height. They are then placed in a metallic mold made to receive and inclose them snugly and closely, and submitted to the usual vulcanizing process, whereby the rubber-gum is properly cured and hardened and its intimate union and combination with the fibrous disks secured. In this operation the expansion of the gum will cause it to fill completely the apertures left in the fibrous disks, so that the rubber sections thereby unite through these apertures, as seen in Fig. 1, and thus render the combination of the entire spring in all its parts from end to end perfect.

Instead of using disks of felt, I use at times radiating strips thereof, or of some textile fabric, as illustrated in Fig. 6, or else fibrous concentric rings, as seen in Fig. 5. In each of these cases the felt serves to check and prevent the expansion of the rubber at these points, leaving it free to play between them alone, while at the same time the slightly-elastic nature of the fibrous material permits the spring to yield, and prevents it from wearing and tearing, as would result from a positively rigid confinement at these points.

Although I prefer to use felt, cotton cloth, wool, &c., yet wood or other non-elastic material may thus be incorporated and combined with the rubber, to confine its expansion, as an improvement upon the iron plates, bands, and rings now in use. Various forms of such wooden checks or check-plates suggest themselves, and I limit myself to none.

The combination of vulcanized-rubber disks with fibrous material may be effected by uniting the two together by means of a solution of rubber in benzine or other solvent thereof; but I contemplate other descriptions of cements for this purpose.

Having thus fully described my invention, I claim therein as new and desire to secure by Letters Patent—

Springs for railway-cars and other purposes formed by the combination of disks, rings, or transverse strips or layers of elastic or non-elastic fibrous material with india-rubber or its equivalent by cementing or vulcanizing the same in contact with such material, all substantially in the manner and for the purpose herein set forth.

The foregoing specification of my improvement in railroad-car springs signed by me this 25th day of July, A. D. 1866.

RICHD. VOSE.

In presence of—
COURTLANDT PALMER, Jr.,
R. R. WOOD.